(12) United States Patent
Shima

(10) Patent No.: US 8,756,295 B2
(45) Date of Patent: Jun. 17, 2014

(54) MONITOR SYSTEM AND IDENTIFIER ASSIGNMENT METHOD ADOPTED IN MONITOR SYSTEM

(75) Inventor: Toshihiro Shima, Shiojiri (JP)

(73) Assignee: Seiko Epson Corp., Tokyo (JP)

( * ) Notice: Subject to any disclaimer, the term of this patent is extended or adjusted under 35 U.S.C. 154(b) by 471 days.

(21) Appl. No.: 11/853,533

(22) Filed: Sep. 11, 2007

(65) Prior Publication Data

US 2008/0062883 A1 Mar. 13, 2008

(30) Foreign Application Priority Data

Sep. 13, 2006 (JP) ................................ 2006-247983

(51) Int. Cl.
*G06F 15/16* (2006.01)
*H04H 20/71* (2008.01)

(52) U.S. Cl.
USPC ............................ 709/218; 709/228; 370/312

(58) Field of Classification Search
USPC ................................................. 709/218, 224
See application file for complete search history.

(56) References Cited

U.S. PATENT DOCUMENTS

| | | | |
|---|---|---|---|
| 6,349,336 B1 | 2/2002 | Sit et al. | |
| 6,553,422 B1 | 4/2003 | Nelson | |
| 6,631,407 B1 * | 10/2003 | Mukaiyama et al. | 709/223 |
| 6,920,502 B2 * | 7/2005 | Araujo et al. | 709/229 |
| 7,007,080 B2 * | 2/2006 | Wilson | 709/221 |
| 7,213,060 B2 * | 5/2007 | Kemp et al. | 709/222 |
| 7,250,854 B2 * | 7/2007 | Rezvani et al. | 340/506 |
| 2002/0008883 A1 * | 1/2002 | Shibata | 358/1.15 |
| 2002/0083342 A1 * | 6/2002 | Webb et al. | 713/201 |
| 2003/0131150 A1 * | 7/2003 | Sugiura | 709/321 |
| 2004/0068566 A1 * | 4/2004 | Ogawa | 709/226 |
| 2005/0201393 A1 * | 9/2005 | Hatayama et al. | 370/401 |
| 2006/0173997 A1 * | 8/2006 | Tullberg et al. | 709/224 |
| 2006/0181425 A1 * | 8/2006 | Crane et al. | 340/612 |
| 2007/0103287 A1 * | 5/2007 | Horitgami et al. | 340/506 |
| 2008/0315990 A1 * | 12/2008 | Komatsu | 340/5.81 |

FOREIGN PATENT DOCUMENTS

| | | |
|---|---|---|
| JP | 08-171524 | 7/1996 |
| JP | 2000-324157 | 11/2000 |
| JP | 2006-048113 | 2/2006 |
| JP | 2006-99609 A | 4/2006 |

* cited by examiner

*Primary Examiner* — Scott Christensen
*Assistant Examiner* — Joiya M Cloud

(57) ABSTRACT

In a device monitor system of the invention including multiple devices, a monitor apparatus, and a terminal that are mutually connected via a network, a serial number (first identifier of physically identifying the device) and a private address of the device are sent from the terminal to the monitor apparatus by e-mail. The monitor apparatus generates an installation ID (second identifier of logically identifying the device) correlated to the received serial number (first identifier), creates a document of a link for an HTTP request including the generated installation ID, a URL of the monitor apparatus, and the received private address of the device, and sends back the document to the terminal by e-mail. The user operates the terminal to click the link for the HTTP request and send the HTTP request to the device. The device receives and analyzes the HTTP request and stores the installation ID in a preset storage location. The device monitor system of the invention enables assignment of the second identifier of logically identifying the device to the device without requiring the user to go to the installation location of the device.

9 Claims, 11 Drawing Sheets

MONITOR SYSTEM AND IDENTIFIER ASSIGNMENT METHOD ADOPTED IN MONITOR SYSTEM

CLAIM OF PRIORITY

The present application claims priority from Japanese patent application P2006-247983A filed on Sep. 13, 2006, the contents of which are hereby incorporated by reference into this application.

BACKGROUND

1. Field of the Invention

The present invention relates to a device monitor system that manages multiple devices connecting with a network by means of a monitor apparatus connecting with the respective devices via the network, as well as to a method of assigning a management identifier to each of the multiple devices in the device monitor system.

2. Related Art

In device monitor systems becoming popular in various fields, devices and a monitor server for monitoring the devices are connected via a network. For example, in one proposed configuration of a printing device monitor system, each printing device has a network board, which is connected to a monitor server via local area networks (LANs) and the Internet. The network board acquires specified pieces of information for monitoring (monitor information), for example, a remaining quantity of toner, error information like a paper jam, and a total number of prints, from a main body of the printing device and sends the acquired monitor information to the monitor server via the network. The monitor server accumulates the monitor information received from the network board and monitors the printing device based on the accumulated monitor information. The printing device monitor system of this configuration is disclosed, for example, in JP-A-2006-99609.

The device monitor system provides the user with various services based on the monitor of the printing device. The services include information service of, for example, promptly notifying the user of the occurrence of an error or a trouble in the printing device based on the monitor information sent to and stored in the monitor server, maintenance service of, for example, sending a new toner in response to a decrease in remaining quantity of toner below a predetermined level, and charging service of, for example, charging for printing based on the number of prints.

In the printing device monitor system, the monitor server needs to identify each printing device as a monitor object. One method adopted for such identification generates an identifier of logically identifying each printing device (hereinafter referred to as installation ID), which is correlated to an identifier of physically identifying the printing device, for example, a MAC address, and assigns the generated installation ID to the printing device as the monitor object. The installation ID represents identification information in the unit of a monitor service contract, for example, a maintenance service contract or a charging service contract, provided by the printing device monitor system via the network. One installation ID is assigned to only one printing device. Namely the installation ID is identification information used for the monitor service of each printing device. In the case of replacement of a failed or old printing device with a new printing device, the installation ID for the replaced printing device is not changed but is continuously assigned to the new printing device. Continuous assignment of the fixed installation ID to the new printing device replacing the failed or old printing device reduces the management load of the monitor server.

For assignment of the installation ID to the printing device, the user is required to receive the installation ID generated by the monitor server by facsimile or another communication medium and enter the installation ID in a display of the printing device. In the event of the user's wrong entry of the installation ID, the monitor server fails to identify the printing device and is unable to adequately manage the printing device. This problem is not characteristic of the printing device monitor system but is commonly found in any device monitor systems.

SUMMARY

An aspect of the present invention is directed to a device monitor system including multiple devices connected to a network and a monitor apparatus connecting with each of the multiple devices via the network.

Each of the multiple devices has: a registration request receptor that receives a registration request for registering the device into the monitor apparatus; and a first transmitter that sends a first identifier of physically identifying the device and a device address given as an address of the device on the network.

The monitor apparatus has: a second identifier generation request receptor that receives a second identifier generation request, which includes the first identifier and the device address and requests generation of a second identifier of logically identifying the device; a second identifier generator that receives the second identifier generation request and generates the second identifier in correlation to the first identifier; and a second transmitter that sends the generated second identifier in correlation to the device address.

In the device monitor system according to this aspect of the invention, the monitor apparatus generates the second identifier, based on the first identifier and the device address received from the device and sends the second identifier in correlation to the device address. The device sets the received second identifier for own identification. This arrangement enables the second identifier to be readily set in the device without requiring the user to go to the installation location of the device.

In one preferable application of this aspect of the invention, the device monitor system further includes an information processing apparatus that is connected to each of the multiple devices via the network.

In this application, the registration request receptor of the device receives the registration request from the information processing apparatus via the network. The first transmitter of the device sends a request for a preset first operation and a monitor apparatus address given as an address of the monitor apparatus, as a response to the registration request, to the information processing apparatus. The second transmitter of the monitor apparatus sends a request for a preset second operation, in addition to the second identifier in correlation with the device address, to the information processing apparatus.

The request for the preset first operation and the request for the preset second operation may be set in diversity of configurations.

In one example, the request for the preset first operation is a request for sending an e-mail to the monitor apparatus address. The request for the preset second operation is a request for generating an HTTP request to be sent to the device address.

In another example, the request for the preset first operation is a request for generating an HTTP request to be sent to the monitor apparatus address. The request for the preset second operation is a request for generating an HTTP request to be sent to the device address.

In one preferable embodiment of the device monitor system, the first transmitter of the device sends the first identifier and the device address to the monitor apparatus. The second transmitter of the monitor apparatus sends the second identifier in correlation to the device address to the device.

At least part of the sending by the first transmitter and the sending by the second transmitter may be encrypted according to the requirements. In the device monitor system according to the above aspect of the invention, it is preferable that the device further has a second identifier receiving/setting unit that receives the second identifier and sets the received second identifier as an identifier of the device.

Another aspect of the present invention is directed to a device that is connected to a network and is monitored by a monitor apparatus via the network.

The device has: a registration request receptor that receives a registration request for registering the device into the monitor apparatus; a transmitter that sends a first identifier of physically identifying the device and a device address given as an address of the device on the network; and a second identifier receiving/setting unit that receives a second identifier of logically identifying the device, which is correlated to the first identifier, and sets the received second identifier for own identification.

Still another aspect of the present invention is directed to a method of setting an identifier into a device, which is connected to a network and is monitored by a monitor apparatus via the network.

The method receives a registration request for registering the device into the monitor apparatus, and sends a first identifier of physically identifying the device and a device address given as an address of the device on the network. The method then receives a second identifier of logically identifying the device, which is correlated to the first identifier, and sets the received second identifier for own identification.

DESCRIPTION OF THE PREFERRED EMBODIMENTS

Some modes of carrying out the invention are described below in the following sequence as preferred embodiments with reference to the accompanied drawings:
A. Outline of Device Monitor System
B. Outline of Monitoring Process
C. Embodiments
D. Modifications

A. OUTLINE OF DEVICE MONITOR SYSTEM

Figure 1:
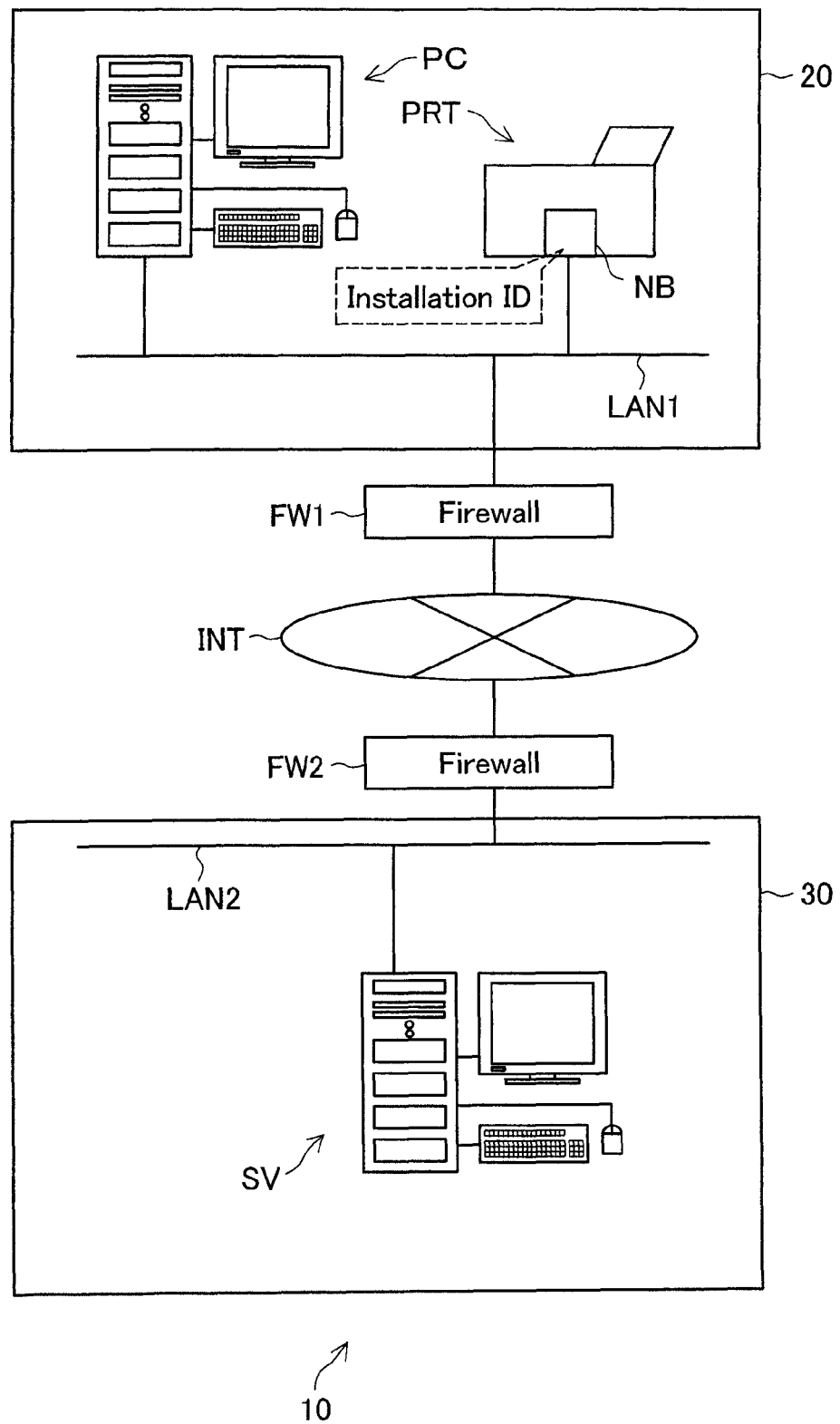
FIG. 1 schematically illustrates the configuration of a printing device monitor system embodying the invention.

FIG. 1 schematically illustrates the configuration of a printing device monitor system 10 embodying the invention. The printing device monitor system 10 has a user network system 20 and a monitor network system 30 respectively connected to the Internet INT via firewalls FW1 and FW2. The user network system 20 includes a personal computer PC and multiple printers (only one printer PRT is shown in FIG. 1) connected to a local area network LAN1. The monitor network system 30 includes a monitor server SV connected to a local area network LAN2.

The printer PRT as a monitor object has a network board NB for connection with the local area network LAN1. An installation ID is registered in the network board NB.

The monitor server SV functions as a monitor apparatus of the printer PRT. The monitor server SV receives monitor information from the printer PRT and other printers (not shown) under the management contract at preset timings and stores the received monitor information. The monitor server SV generates the installation ID as a second identifier according to a procedure described later.

Figure 2:
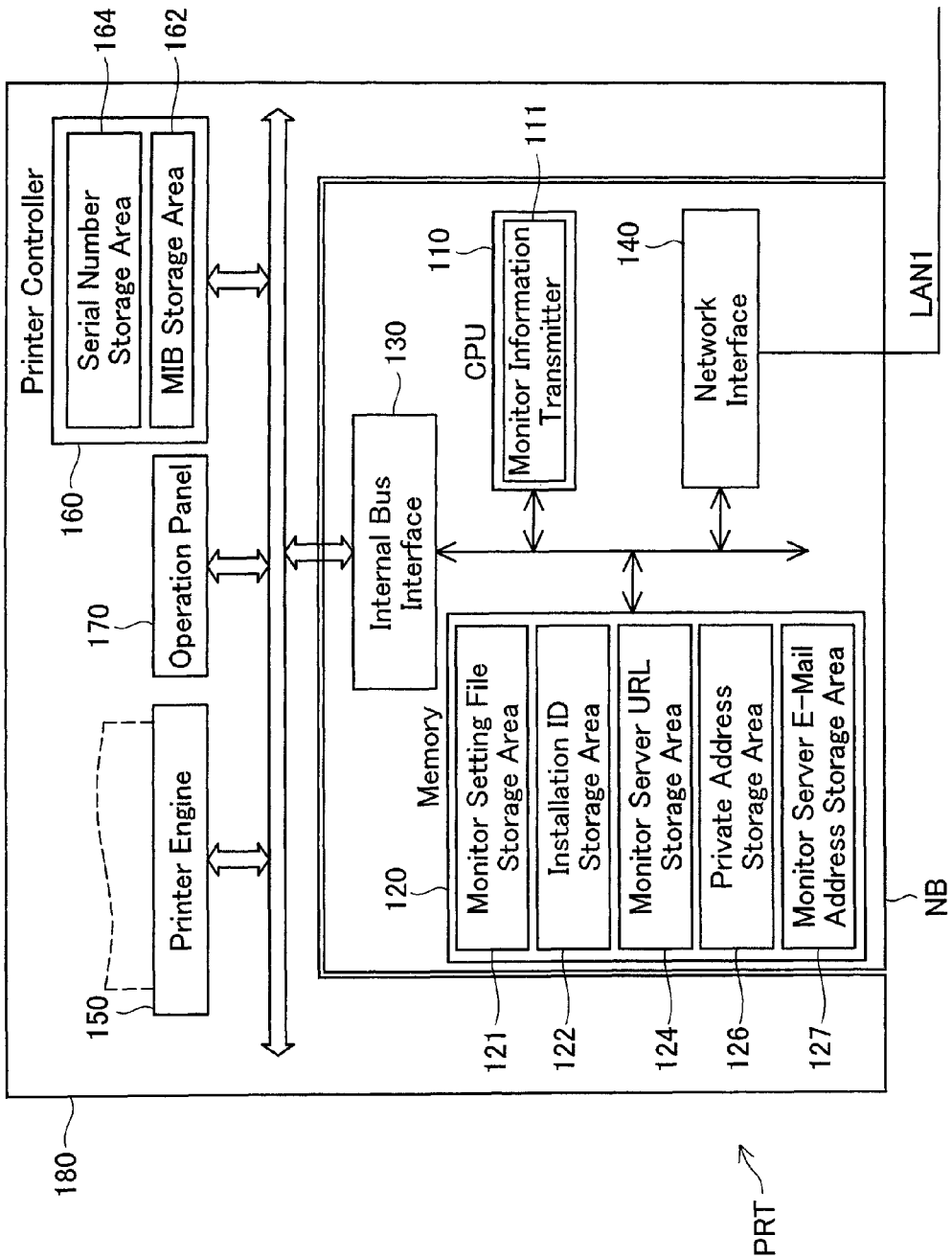
FIG. 2 schematically shows the structure of a printer PRT as a monitor object in the printing device monitor system of FIG. 1.

FIG. 2 schematically shows the structure of the printer PRT as the monitor object in the printing device monitor system of FIG. 1. The printer PRT has a printer main body 180 and the network board NB attached to the printer main body 180.

The printer main body 180 includes a printer engine 150, a printer controller 160, and an operation panel 170 that are mutually connected via an internal bus. The printer engine 150 includes a set of hardware elements relating to printing operations on print paper, for example, a toner cartridge and a photosensitive drum (not shown). The printer controller 160 is constructed as a computer including a CPU and memories (not shown) and controls the printer engine 150 to perform printing operations according to print job data received via the local area network LAN1. The operation panel 170 has operation buttons and a liquid crystal display (not shown) and is operated by the user for making various settings and operations of the printer PRT and for checking the operating status.

The printer controller 160 collects required pieces of information relating to the printer main body 180, for example, a remaining quantity of toner in the printer engine 150 and stores the collected pieces of information in the form of an MIB (management information base). The memory provided in the printer controller 160 has an MIB storage area 162 for storage of the MIB.

The MIB includes objects on the printer main body uniformly set in conformity with the standard and objects independently defined by the manufacturer. These objects are classified by the manufacturer, the model, and the type and are managed in the tree structure. The manufacturer, the model, and the respective objects are referred to by identification numbers called object IDs (OIDs).

The memory provided in the printer controller 160 also has a serial number storage area 164 for storage of a serial number SN allocated to the printer main body 180, in addition to the MIB storage area 162. The serial number SN is registered in the serial number storage area 164 before shipment of the printer PRT.

The network board NB has a CPU 110, a memory 120, an internal bus interface 130, and a network interface 140 that are mutually connected via an internal bus.

The network board NB has Web server functions. The user uses a Web browser installed in a terminal connected to the printer PRT via the network board NB and a network to establish connection with the network board NB and make access to a Web page. The user is then enabled on the Web page to make various settings relating to the printer PRT and check the information relating to the printer PRT, for example, the serial number SN and the operating status of the printer PRT.

The memory 120 includes a monitor setting file storage area 121, an installation ID storage area 122, a monitor server URL storage area 124, a private address storage area 126, and a monitor server e-mail address storage area 127. A monitor processing program is stored in the memory 120.

The monitor setting file storage area 121 stores a monitor setting file that has record of required pieces of information for data transmission between the printer PRT and the monitor server SV, for example, the model name of the printer PRT, the monitor objects, and the storage location of monitor information relating to the model name and the monitor objects.

The installation ID storage area 122 stores the installation ID that is assigned to the printer PRT as a second identifier and is correlated to the serial number SN as a first identifier. The assignment of the installation ID is characteristic of the invention and will be described later in detail. The first identifier is not restricted to the serial number SN of the printer PRT but may be any other physically identifiable identifier, for example, a USB serial number allocated to the printer main body 180 or a MAC address for a network Ethernet allocated to the network board NE.

The monitor server URL storage area 124 stores a URL (uniform resource locator) of the monitor server SV that is used for sending monitor information to the monitor server SV.

The private address storage area 126 stores a private address of the printer PRT in the local area network LAN1, which is set in advance by the user's operations of the operation panel 170.

The monitor server e-mail address 127 stores an e-mail address of the monitor server SV that is required for assigning the installation ID to the printer PRT.

The CPU 110 executes the monitor processing program read from the memory 120 and accordingly works as a monitor server communication module having a monitor information transmitter 111.

The internal bus interface 130 interfaces the connection between the internal bus of the printer main body 180 and the internal bus of the network board NB. The network interface 140 interfaces the connection between the network board NB and the local area network LAN1.

Figure 3:
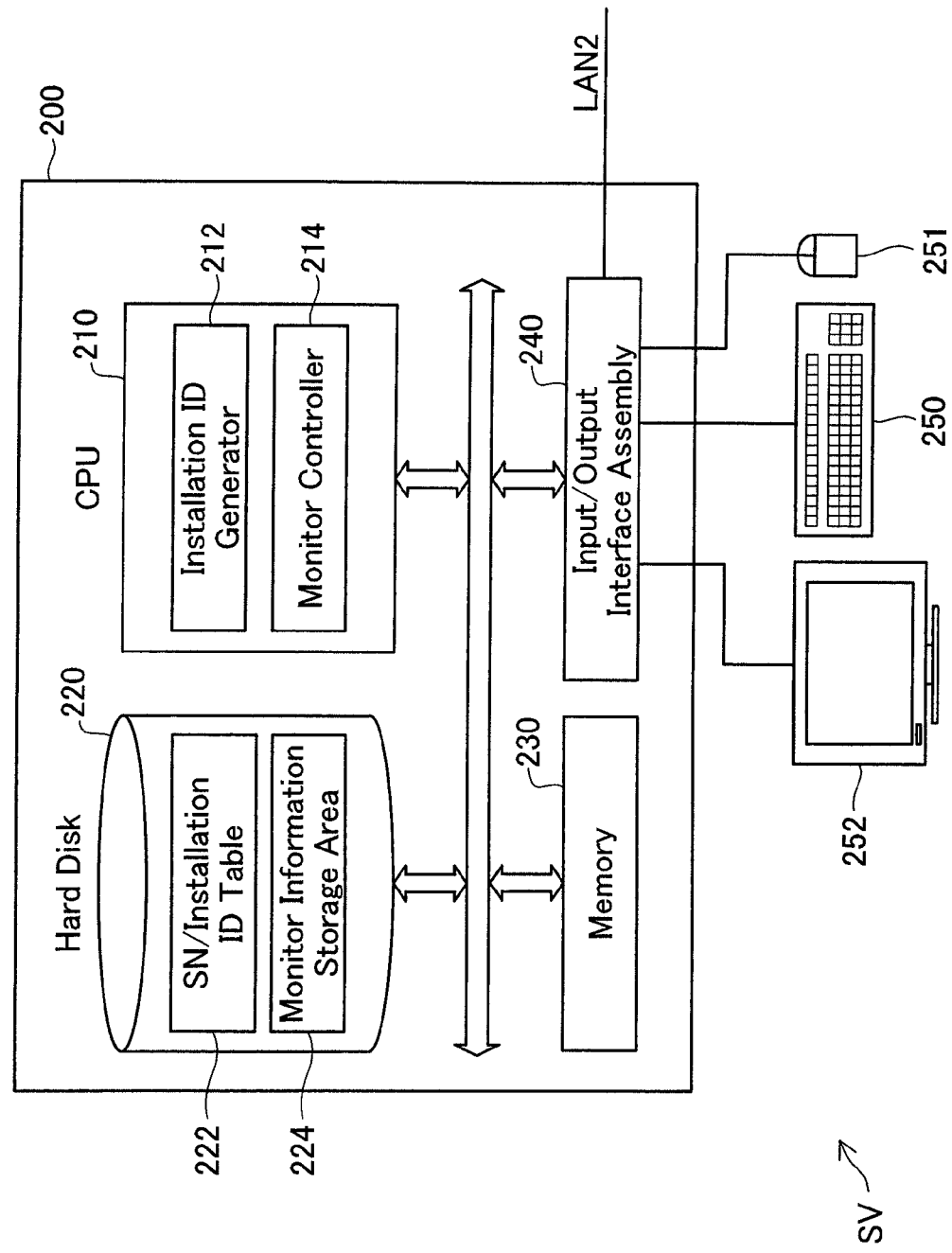
FIG. 3 schematically shows the structure of a monitor server SV in the printing device monitor system of FIG. 1.

FIG. 3 schematically shows the structure of the monitor server SV in the printing device monitor system 10 of FIG. 1. The monitor server SV is constructed by a computer 200 including a CPU 210, a hard disk 220, a memory 230, and an input/output interface assembly 240 that are mutually connected via an internal bus. The monitor server SV also includes a keyboard 250 and a mouse 251 as data input devices and a display 252 as an image output device.

The CPU 210 executes a predetermined program read from the hard disk 220 to function as an installation ID generator 212 and a monitor controller 214. The hard disk 220 has an SN/installation ID table 222 and a monitor information storage area 224. The SN/installation ID table 222 correlates the installation ID to the serial number SN. The input/output interface assembly 240 has a group of interfaces for connection of the keyboard 250, the mouse 251, the display 252, and the local area network LAN2 with the computer 200.

B. OUTLINE OF MONITORING PROCESS

The outline of the monitoring process in the printing device monitor system 10 is described briefly. In the printing device monitor system 10 of FIG. 1, the firewall FW1 has the settings given below to enable a device connecting with the local area network LAN1 to transmit data to and from the outside, while preventing any illegal access to the device from the outside via the Internet INT.

[A] Access requests sent from the outside of the local area network LAN1 via the Internet INT to the device connecting with the local area network LAN1 are rejected in principle.

[B] Outputs, for example, e-mails and HTTP requests, from the inside of the local area network LAN1 are allowed.

[C] As communication from the outside of the local area network LAN1, only responses to the requests output from the inside of the local area network LAN1 through the connection from the inside to the outside are allowed.

The firewall FW2 is set to allow communication in a specified protocol to the monitor server SV via the Internet INT.

In the printing device monitor system 10, the printer PRT sends an access request to the monitor server SV to establish connection between the printer PRT and the monitor server SV and send monitor information of the printer PRT to the monitor server SV. The monitor server SV stores the received monitor information and monitors the printer PRT based on the stored monitor information according to the following procedure.

In the printer PRT, the monitor information transmitter 111 reads the monitor setting file stored in the monitor setting file storage area 121 at a preset monitor timing. The monitor information transmitter 111 acquires monitor information relating to the monitor objects specified in the monitor setting file from the MIB stored in the MIB storage area 162 provided in the printer controller 160. The monitor information includes a tray type as component information, version information of the firmware, a toner type, a photoreceptor type, and a remaining quantity of toner as expendable information, and an alert as warning information.

The monitor information transmitter 111 establishes connection with the monitor server SV and sends the acquired monitor information to the monitor server SV via the local area network LAN1, the Internet INT, and the local area network LAN2.

In the monitor server SV, the monitor controller 214 receives the monitor information from the printer PRT and stores the received monitor information into the monitor information storage area 224 set in the hard disk 220. The monitor information on the printer PRT is accumulated in the hard disk 220 of the monitor server SV. Maintenance services, for example, notification of toner replacement timing and notification of supplementary information of firmware functions, are based on the accumulated monitor information.

C. EMBODIMENTS

Several methods applicable for the assignment of the installation ID to the printer PRT are described below as Embodiments 1 through 3.

1st Embodiment: The printer PRT has storage of at least the e-mail address of the monitor server SV before shipment. The printer PRT uses e-mails to make communication with the monitor server SV via the personal computer PC.

2nd Embodiment: The printer PRT has storage of at least the URL of the monitor server SV before shipment. The printer PRT utilizes the HTTP protocol to make communication with the monitor server SV via the personal computer PC.

3rd Embodiment: The printer PRT has storage of at least the URL of the monitor server SV before shipment. The printer PRT makes direct communication with the monitor server SV.

C-1. 1st Embodiment

Figure 4:
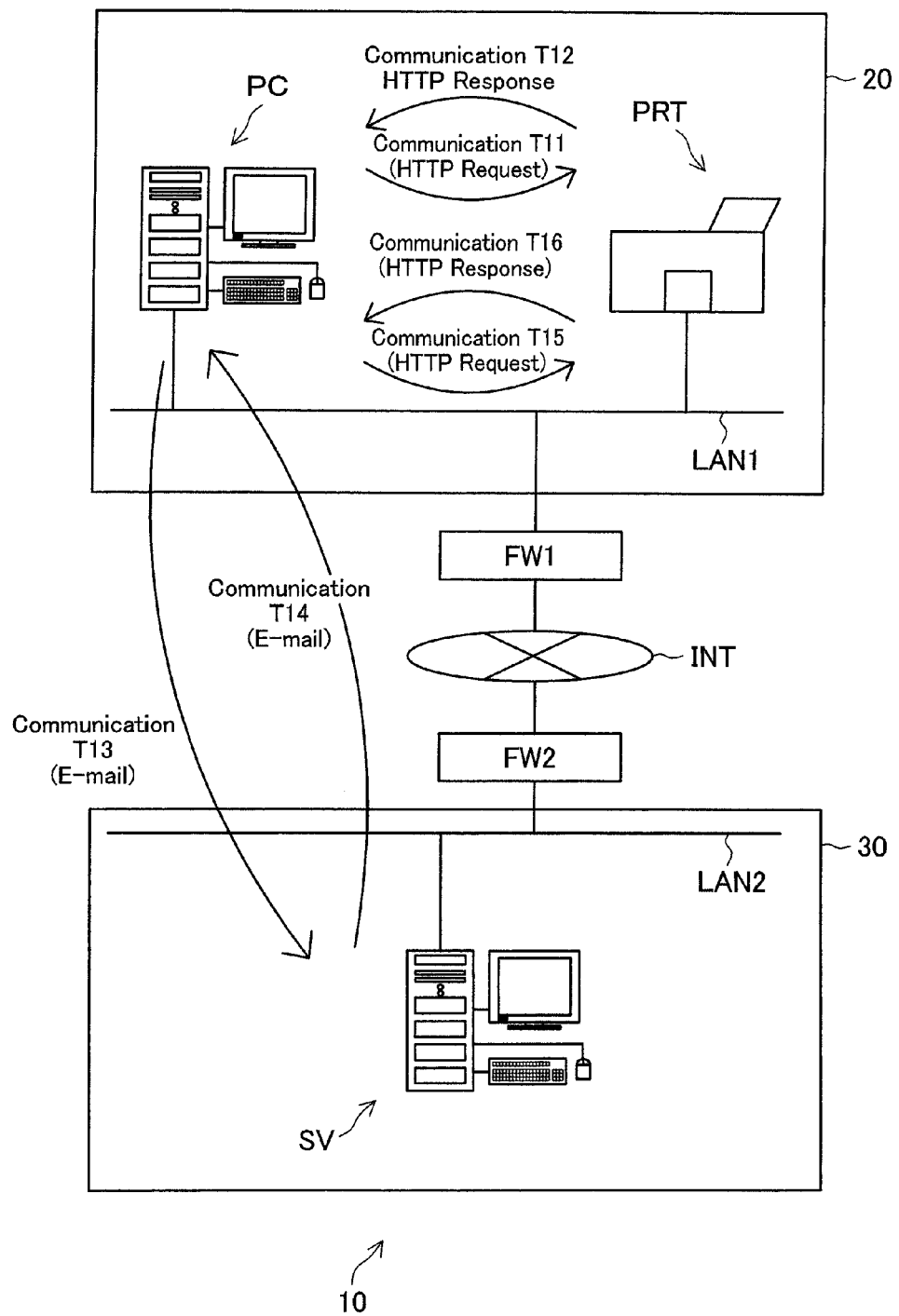
FIG. 4 shows a sequence of communication required for assigning an installation ID to the printer PRT as the monitor object in 1st Embodiment.

FIG. 4 shows a sequence of communication required for assigning the installation ID to the printer PRT as the monitor object in 1st Embodiment. The installation ID is assigned to the printer PRT in the following sequence of communication:

[1] communication T11 as an HTTP request and communication T12 as an HTTP response between the personal computer PC and the printer PRT inside the local area network LAN1;

[2] communications T13 and T14 as transmission of e-mails between the personal computer PC in the local area network LAN1 and the monitor server SV in the local area network LAN2 via the firewalls FW1 and FW2, the Internet INT, and a mail server (not shown); and

[3] communication T15 as an HTTP request and communication T16 as an HTTP response between the personal computer PC and the printer PRT inside the local area network LAN1.

For the simplicity of illustration, the communications T13 and T14 are shown as direct connection between the personal computer PC and the monitor server SV in FIG. 4. The communications T13 and T14 are, however, actually made via the pathway including the Internet INT, as mentioned above.

Figure 5:
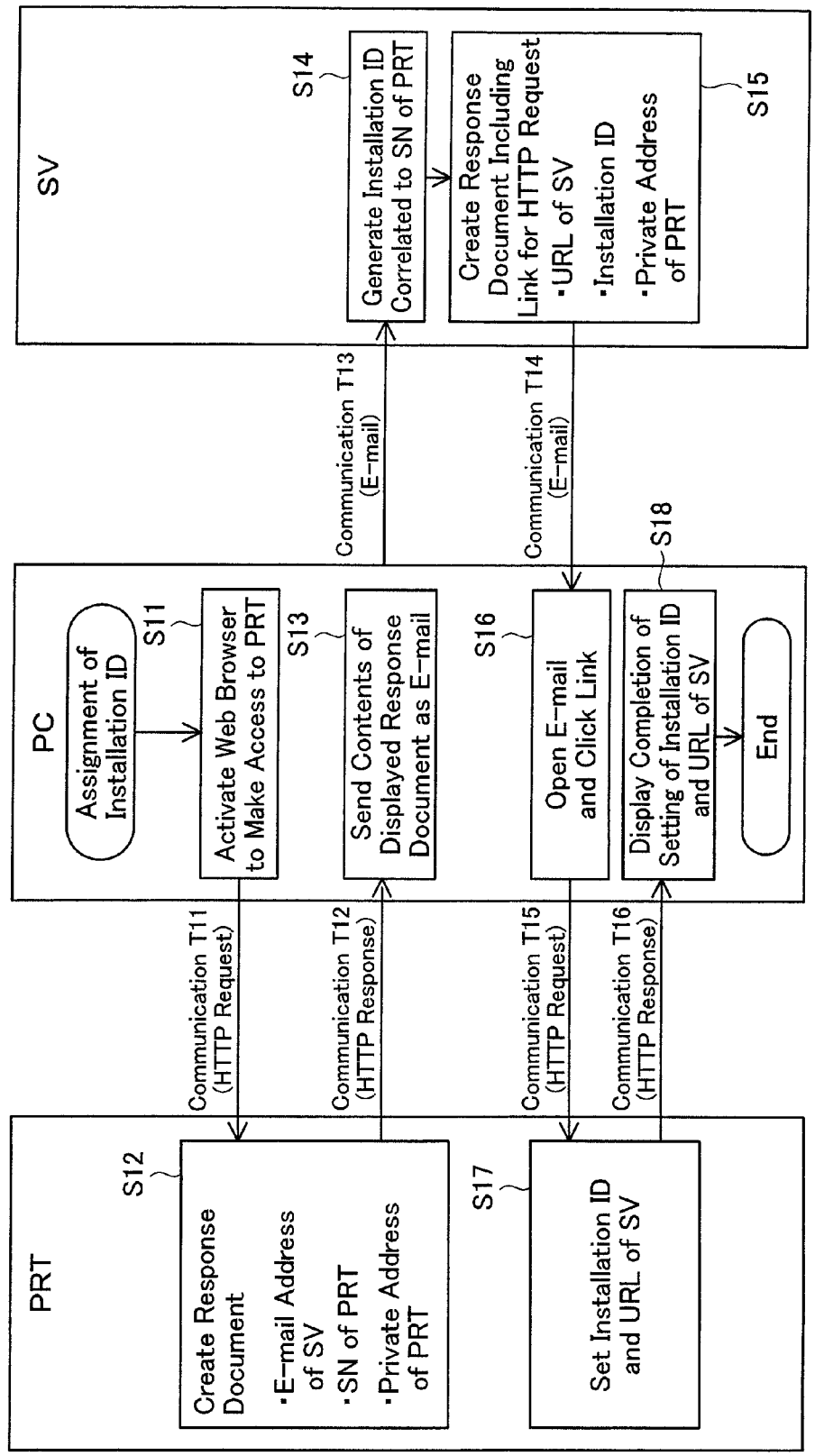
FIG. 5 shows operations and mutual communications of the respective parts in the printing device monitor system according to the communication sequence of FIG. 4 in 1st Embodiment.

FIG. 5 shows operations and mutual communications of the respective parts in the printing device monitor system 10 according to the communication sequence of FIG. 4 in 1st Embodiment. The operations of the personal computer PC, the printer PRT, and the monitor server SV and the mutual communications are involved in the assignment of the installation ID to the printer PRT as described below.

As a preliminary operation, the user operates the operation panel 170 of the printer PRT to set the private address of the printer PRT in the local area network LAN1. The user is then enabled to make access to the printer PRT in the local area network LAN1 and utilize the server functions of the printer PRT. The user activates the Web browser installed in the personal computer PC of the user network system 20, manually enters the private address of the printer PRT to make access to a Web page of the printer PRT, and sends an HTTP request to the printer PRT (step S11, communication T11).

The printer PRT in the user network system 20 receives the HTTP request sent from the personal computer PC at step S11. The CPU 110 of the printer PRT acquires the serial number SN of the printer PRT from the serial number storage area 164 provided in the printer controller 160, the private address of the printer PRT in the local area network LAN1 from the private address storage area 126 set in the memory 120, and the e-mail address of the monitor server SV from the monitor server e-mail address storage area 127 set in the memory 120 and sends the acquired pieces of information as an HTTP response to the personal computer PC (step S12, communication T12). The e-mail address of the monitor server SV is stored in advance in the monitor server e-mail address storage area 127 before shipment of the printer PRT.

The personal computer PC receives the HTTP response sent from the printer PRT at step S12 and displays the e-mail address of the monitor server SV, the serial number SN of the printer PRT, and the private address of the printer PRT in the window of the Web browser. The user copies the displayed pieces of information and sends an e-mail including the copy of the serial number SN and the private address of the printer PRT to the monitor server SV (step S13, communication T13).

The e-mail to be sent at step S13 may be prepared in a fixed format by creating a certain format document at step S12 and specifying a copy region of the document. This facilitates automatic processing of step S14.

In the method of 1st Embodiment, the user copies the pieces of information displayed in the window of the Web browser and sends the e-mail including the copied information at step S13. According to one possible modification, the printer PRT creates a link document for transmission of an e-mail including the serial number SN and the private address of the printer PRT to the monitor server SV and sends the created link document to the personal computer PC at step S12. The user clicks the link in the link document displayed in the window of the Web browser to send an automatically created e-mail to the monitor server SV at step S13. This saves the user's labor and time and eliminates the user's operation error, while facilitating automatic processing of step S14.

The monitor server SV in the monitor network system 30 receives the e-mail sent from the personal computer PC at step S13 and generates the installation ID correlated to the serial number SN of the printer PRT included in the received e-mail (step S14).

The monitor server SV subsequently creates a response document including a link for an HTTP request, based on the installation ID generated at step S14, the own-stored URL (uniform resource locator) of the monitor server SV, and the private address of the printer PRT sent from the personal computer PC at step S13, and sends back the response document as an e-mail to the personal computer PC (step S15, communication T14).

Figure 6:
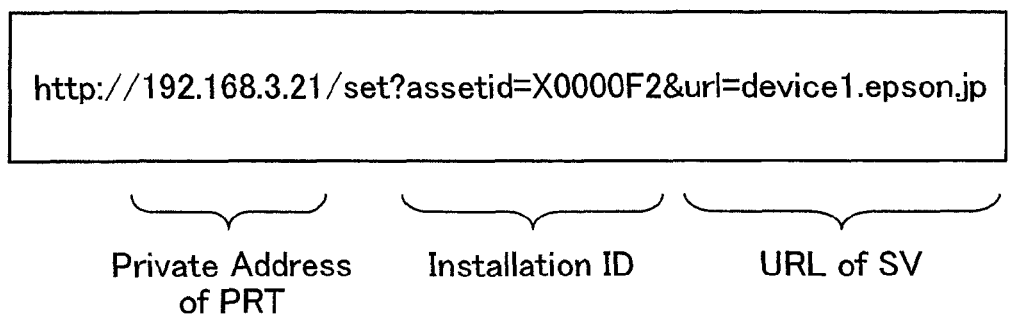
FIG. 6 shows one example of a link for an HTTP request in 1st Embodiment.

The user operates the personal computer PC to open the e-mail sent from the monitor server SV at step S15 and clicks the link for the HTTP request (step S16, communication T15). FIG. 6 shows one example of the link for the HTTP request. The link includes the private address of the printer PRT, the installation ID, and the URL of the monitor server SV as information. The link of the illustrated example represents an HTTP request for the printer PRT having a private address of '192.168.3.21' to respectively set 'X0000F2' and 'devicel.epson.jp' in the installation ID (asset ID) of the printer PRT and in the URL of the monitor server SV as variables. The user's click of this link sends the HTTP request to the printer PRT. The printer PRT interprets the received HTTP request and stores the settings of the installation ID and the URL of the monitor server SV in specific storage locations.

The printer PRT receives the HTTP request sent from the personal computer PC at step S16 and stores the installation ID and the URL of the monitor server SV respectively into the installation ID storage area 122 and the monitor server URL storage area 124 set in the non-volatile memory 120 (step S17).

The printer PRT then creates an end document as an HTTP response to the HTTP request sent at step S16 and sends the created end document to the personal computer PC (communication T16). The end document notifies the personal computer PC of completion of the setting of the installation ID and the URL of the monitor server SV. The personal computer PC displays the end document in the window of the Web browser (step S18).

The installation ID assignment method of 1st Embodiment readily assigns the installation ID to the printer PRT via the local area networks LAN1 and LAN2 and the Internet INT without the user's manual entry of the installation ID. The user performs the series of operations, while checking the display of the e-mails including the information to be sent from the personal computer PC to the monitor server SV (step S13) and the information to be sent from the personal computer PC to the printer PRT (step S16). This arrangement desirably prevents unintentional transmission of undesired information.

C-2. 2nd Embodiment

Figure 7:
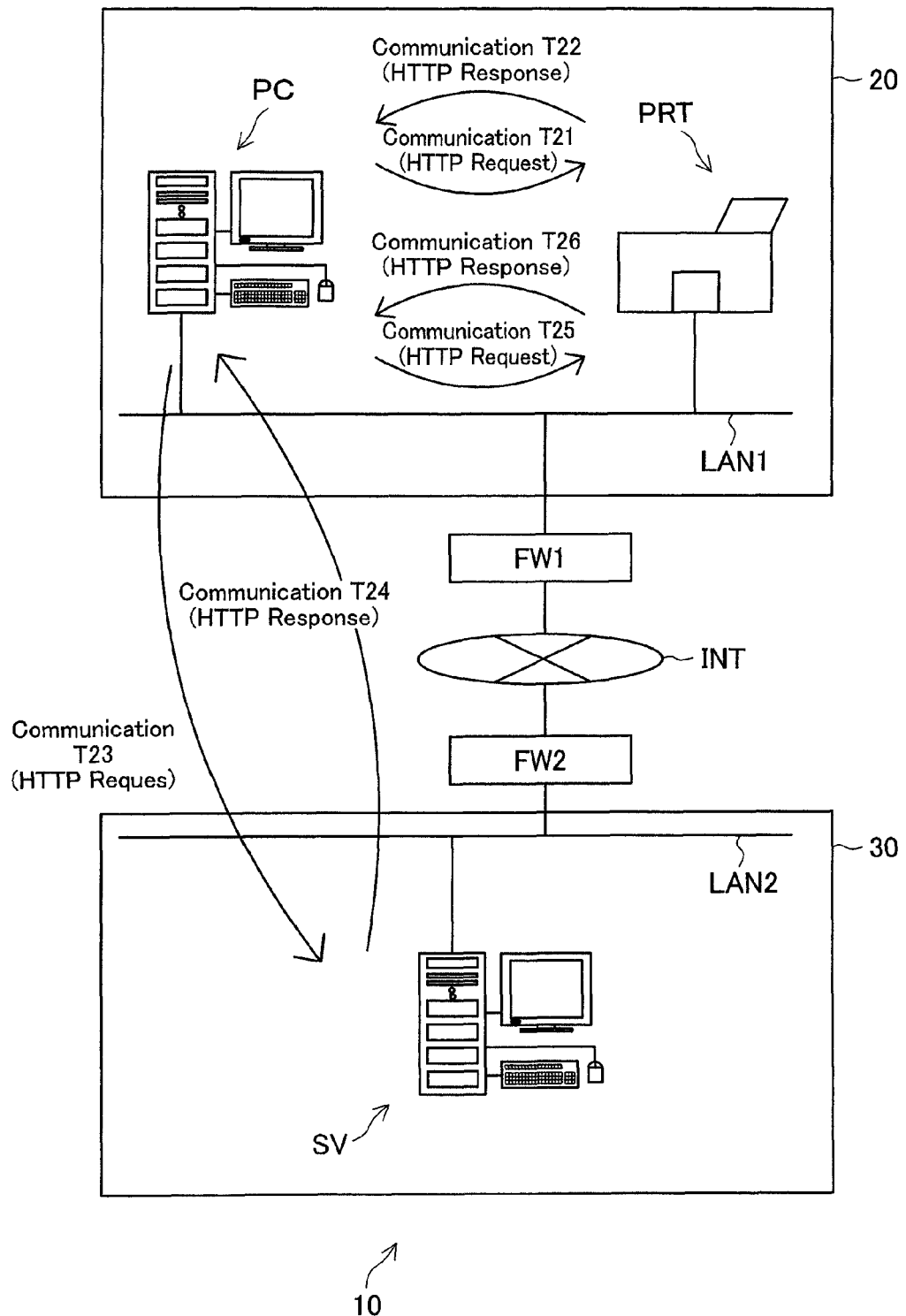
FIG. 7 shows a sequence of communication required for assigning an installation ID to the printer PRT as the monitor object in 2nd Embodiment.

FIG. 7 shows a sequence of communication required for assigning the installation ID to the printer PRT as the monitor object in 2nd Embodiment. The installation ID is assigned to the printer PRT in the following sequence of communication:

[1] communication T21 as an HTTP request and communication T22 as an HTTP response between the personal computer PC and the printer PRT inside the local area network LAN1;

[2] communication T23 as an HTTP request and communication T24 as an HTTP response between the personal computer PC in the local area network LAN1 and the monitor server SV in the local area network LAN2 via the firewalls FW1 and FW2, the Internet INT, and a proxy server (not shown); and

[3] communication T25 as an HTTP request and communication T26 as an HTTP response between the personal computer PC and the printer PRT inside the local area network LAN1.

For the simplicity of illustration, the communications T23 and T24 are shown as direct connection between the personal computer PC and the monitor server SV in FIG. 7. The communications T23 and T24 are, however, actually made via the pathway including the Internet INT, as mentioned above.

Figure 8:
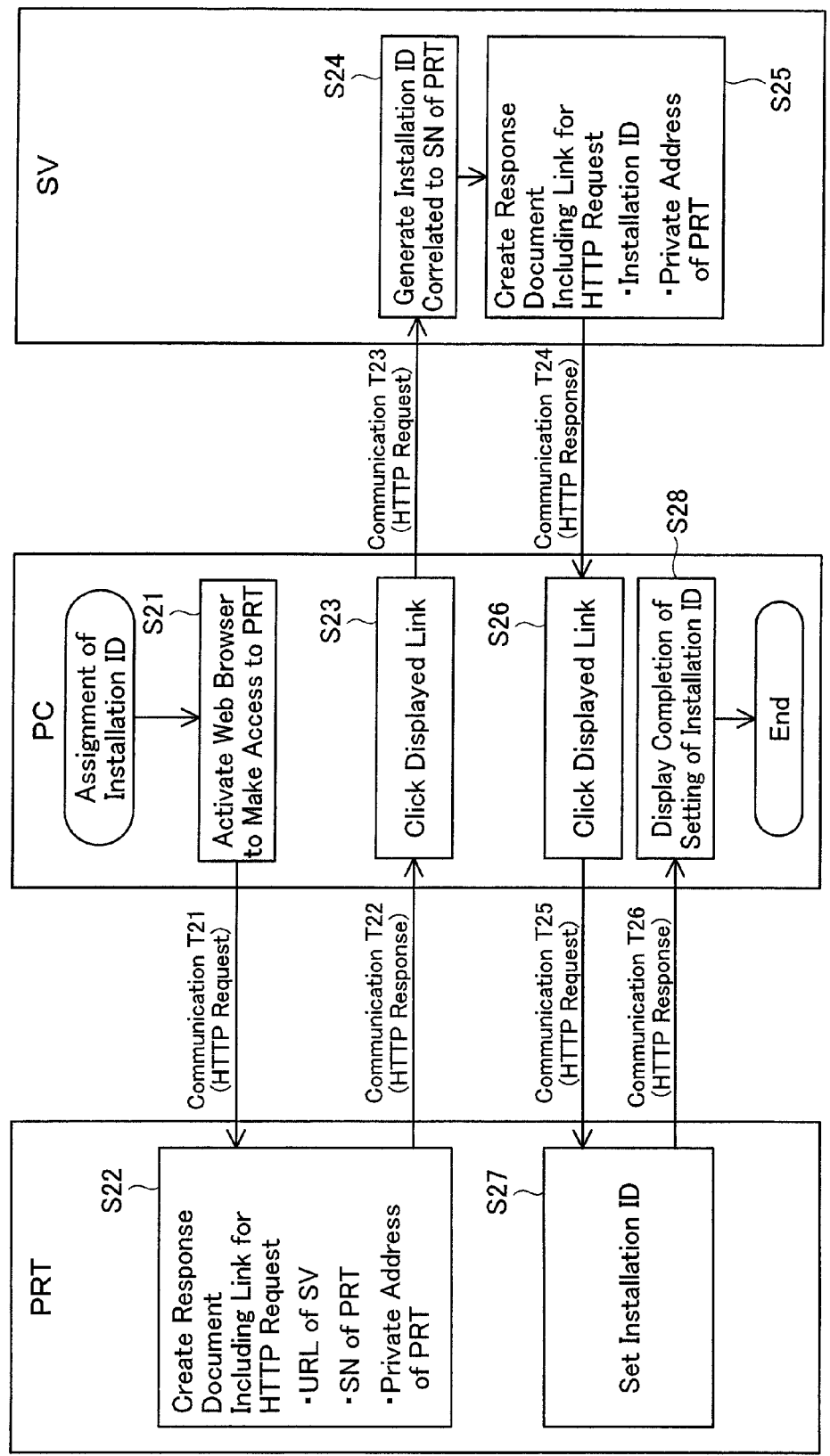
FIG. 8 shows operations and mutual communications of the respective parts in the printing device monitor system according to the communication sequence of FIG. 7 in 2nd Embodiment.

FIG. 8 shows operations and mutual communications of the respective parts in the printing device monitor system 10 according to the communication sequence of FIG. 7 in 2nd Embodiment. The operations of the personal computer PC, the printer PRT, and the monitor server SV and the mutual communications are involved in the assignment of the installation ID to the printer PRT as described below.

As a preliminary operation, the user operates the operation panel 170 of the printer PRT to set the private address of the printer PRT in the local area network LAN1. The user is then enabled to make access to the printer PRT in the local area network LAN1 and utilize the server functions of the printer PRT. The user activates the Web browser installed in the personal computer PC of the user network system 20, manually enters the private address of the printer PRT to make access to a Web page of the printer PRT, and sends an HTTP request to the printer PRT (step S21, communication T21).

The printer PRT in the user network system 20 receives the HTTP request sent from the personal computer PC at step S21. The CPU 110 of the printer PRT acquires the URL of the monitor server SV from the monitor server URL storage area 124 set in the memory 120, the serial number SN of the printer PRT from the serial number storage area 164 provided in the printer controller 160, and the private address of the printer PRT in the local area network LAN1 from the private address storage area 126 set in the memory 120. The CPU 110 then creates a response document including a link for an HTTP request, based on these acquired pieces of information and sends the created response document as an HTTP response to the personal computer PC (step S22, communication T22). The URL of the monitor server SV is stored in advance in the monitor server URL storage area 124 before shipment of the printer PRT.

Figure 9:
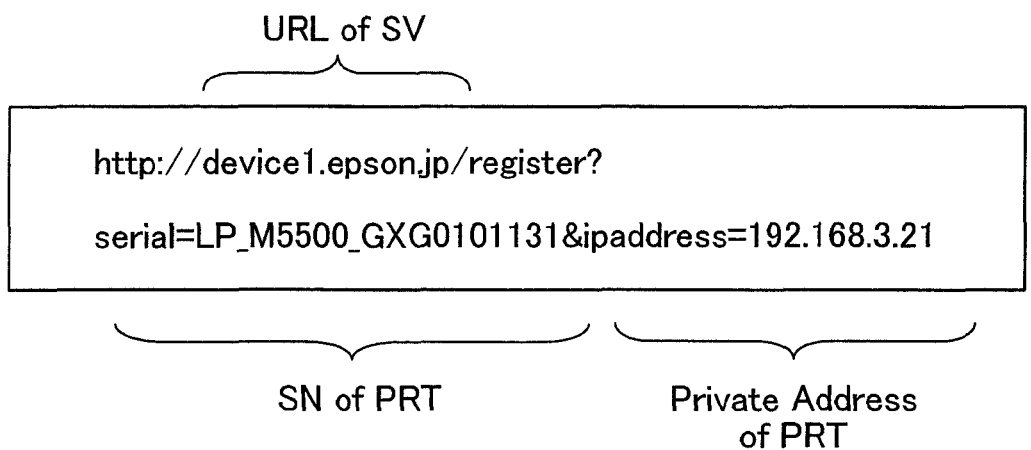
FIG. 9 shows one example of a link for a first HTTP request in 2nd Embodiment.

The personal computer PC receives the HTTP response sent from the printer PRT at step S22 and displays the received response document including the link for the HTTP request in the window of the Web browser. The user clicks the link to send the HTTP request to the monitor server SV (step S23, communication T23). FIG. 9 shows one example of the link for the HTTP request. The link includes the URL of the monitor server SV and the serial number SN and the private address of the printer PRT as information. The link of the illustrated example represents an HTTP request for the monitor server SV having an URL of 'devicel.epson.jp' to respectively set 'LP_M5500_GXG0101131' and '192.168.3.21' in the serial number SN and the private address of the printer PRT as variables. The user's click of this link sends the HTTP request to the monitor server SV. The monitor server SV interprets the received HTTP request and stores the settings of the serial number SN and the private address of the printer PRT in specific storage locations.

The monitor server SV in the monitor network system 30 receives the HTTP request sent from the personal computer PC at step S23 and generates the installation ID correlated to the serial number SN of the printer PRT included in the received HTTP request (step S24).

The monitor server SV subsequently creates a response document including a link for an HTTP request, based on the installation ID generated at step S24 and the private address of the printer PRT sent from the personal computer PC at step S23, and sends back the response document as an HTTP response to the personal computer PC (step S25, communication T24).

Figure 10:
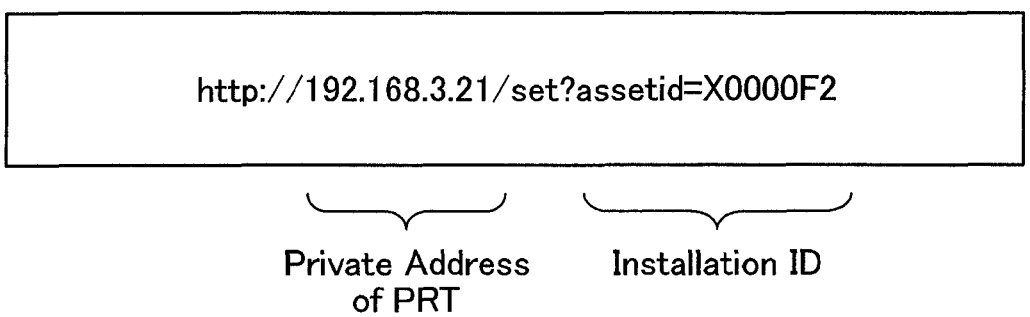
FIG. 10 shows one example of a link for a second HTTP request in 2nd Embodiment.

The personal computer PC receives the HTTP response sent from the monitor server SV at step S25 and displays the received response document including the link for the HTTP request in the window of the Web browser. The user clicks the link to send the HTTP request to the printer PRT (step S26, communication T25). FIG. 10 shows one example of the link for the HTTP request. The link includes the private address of the PRT and the installation ID as information. The link of the illustrated example represents an HTTP request for the printer PRT having a private address of '192.168.3.21' to set 'X0000F2' in the installation ID (asset ID) of the printer PRT as a variable. The user's click of this link sends the HTTP request to the printer PRT. The printer PRT interprets the received HTTP request and stores the setting of the installation ID in a specific storage location.

The printer PRT receives the HTTP request sent from the personal computer PC at step S26 and stores the installation ID into the installation ID storage area 122 set in the memory 120 (step S27).

The printer PRT then creates an end document as an HTTP response to the HTTP request sent at step S26 and sends the created end document to the personal computer PC (communication T26). The end document notifies the personal computer PC of completion of the setting of the installation ID. The personal computer PC displays the end document in the window of the Web browser (step S28).

The installation ID assignment method of 2nd Embodiment does not require the user's manual entry of the installation ID but requires only the user's simple operation of clicking the links displayed in the window of the Web browser to assign the installation ID to the printer PRT via the local area networks LAN1 and LAN2 and the Internet INT.

In the event of a failure or a trouble of the printer PRT, the procedure of 2nd Embodiment does not enable the user's support by transmission of e-mails between the user and the monitor server SV. In one preferable application, the response document created at step S22 may have an input field for the user's e-mail address. The user may manually enter the own e-mail address in the input field and send the HTTP request with the entered e-mail address to the monitor server SV at step S23. This arrangement notifies the monitor server SV of the user's e-mail address and enables the user's support by e-mails.

In another preferable application, a document of simply showing information to be sent from the personal computer PC to the monitor server SV may be displayed with the link for the HTTP request in the window of the Web browser at step S23. Similarly a document of simply showing information to be sent from the personal computer PC to the printer PRT may be displayed with the link for the HTTP request in the window of the Web browser at step S26. This arrangement enables the user to check the information and thus desirably prevents unintentional transmission of undesired information.

C-3. 3rd Embodiment

Figure 11:
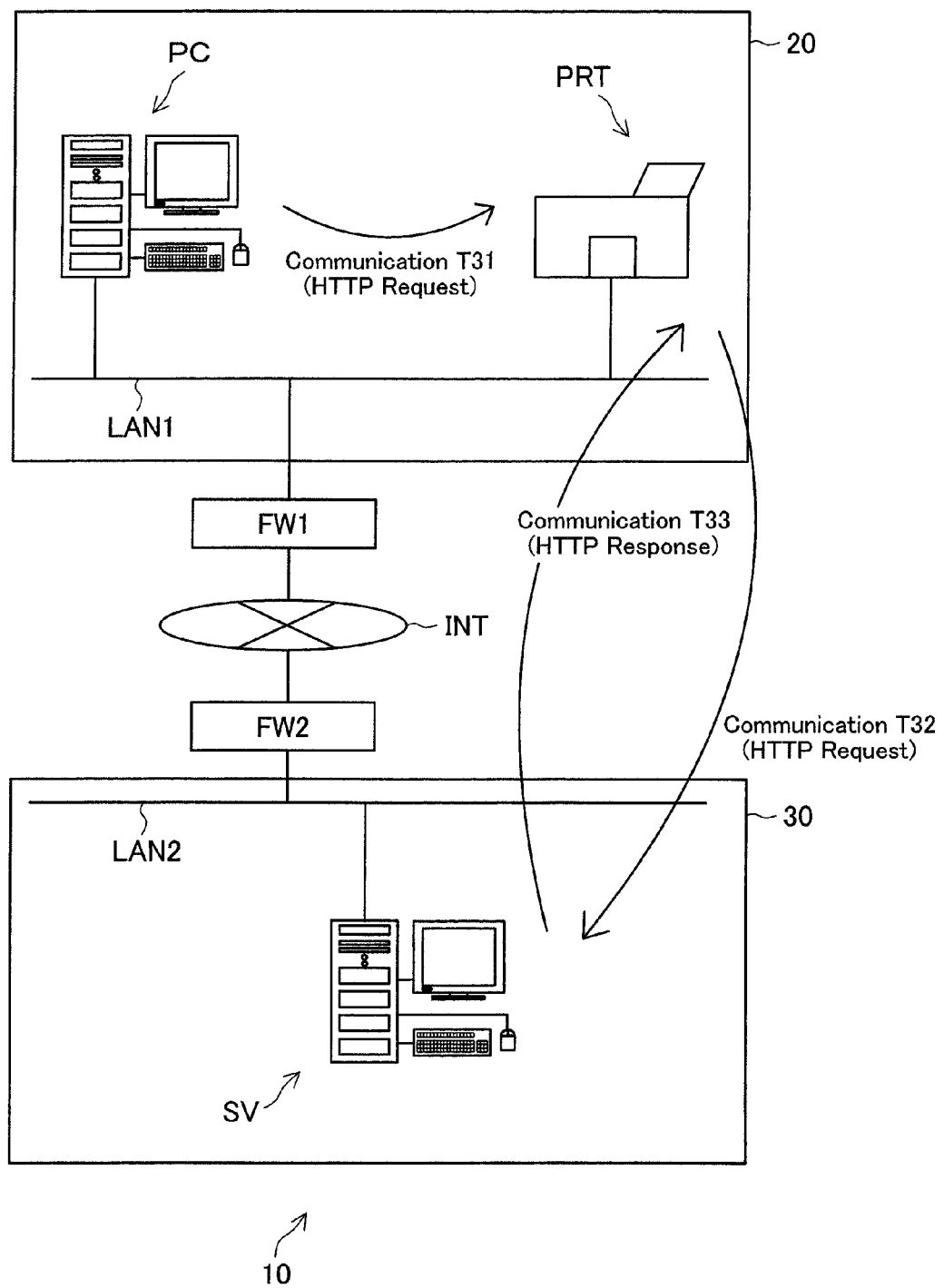
FIG. 11 shows a sequence of communication required for assigning an installation ID to the printer PRT as the monitor object in 3rd Embodiment.

FIG. 11 shows a sequence of communication required for assigning the installation ID to the printer PRT as the monitor object in 3rd Embodiment. The installation ID is assigned to the printer PRT in the following sequence of communication:

[1] communication T31 as an HTTP request from the personal computer PC to the printer PRT inside the local area network LAN1; and

[2] communication T32 as an HTTP request and communication T33 as an HTTP response between the personal computer PC in the local area network LAN1 and the monitor server SV in the local area network LAN2 via the firewalls FW1 and FW2, the Internet INT, and a proxy server (not shown).

For the simplicity of illustration, the communications T32 and T33 are shown as direct connection between the personal computer PC and the monitor server SV in FIG. 11. The communications T32 and T33 are, however, actually made via the pathway including the Internet INT, as mentioned above.

Figure 12:
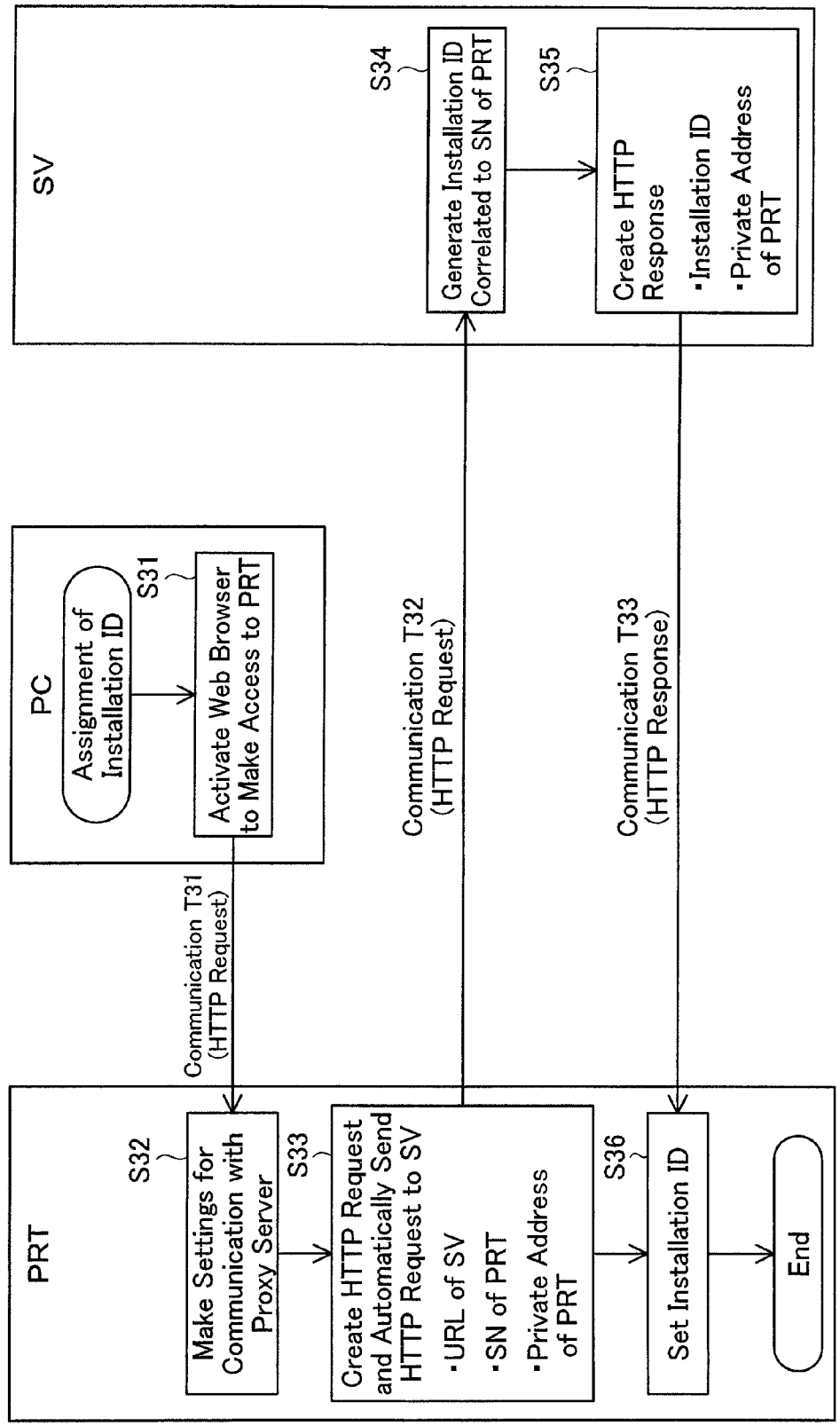
FIG. 12 shows operations and mutual communications of the respective parts in the printing device monitor system according to the communication sequence of FIG. 11 in 3rd Embodiment.

FIG. 12 shows operations and mutual communications of the respective parts in the printing device monitor system 10 according to the communication sequence of FIG. 11 in 3rd Embodiment. The operations of the personal computer PC, the printer PRT, and the monitor server SV and the mutual communications are involved in the assignment of the installation ID to the printer PRT as described below.

As a preliminary operation, the user operates the operation panel 170 of the printer PRT to set the private address of the printer PRT in the local area network LAN1. The user is then enabled to make access to the printer PRT in the local area network LAN1 and utilize the server functions of the printer PRT. The user activates the Web browser installed in the personal computer PC of the user network system 20, manually enters the private address of the printer PRT to make access to a Web page of the printer PRT, and sends an HTTP request to the printer PRT (step S31, communication T31).

Settings required for communication between the printer PRT and the proxy server in the user network system 20 are made in the printer PRT in the user network system 20 (step S32). According to a concrete procedure, in response to the HTTP request sent from the personal computer PC at step S31, the printer PRT opens a window for communication settings with the proxy server in the user network system 20, on the Web browser in the personal computer PC. The user enters an IP address of the proxy server, a port number, the user's name, and a password in the window to make the communication settings in the printer PRT. The printer PRT is then enabled to make communication with the proxy server, that is, with the monitor server SV via the Internet INT and the local area networks LAN1 and LAN2.

In the printer PRT of the user network system 20, the CPU 110 acquires the URL of the monitor server SV from the monitor server URL storage area 124 set in the memory 120, the serial number SN of the printer PRT from the serial number storage area 164 provided in the printer controller 160, and the private address of the printer PRT in the local area network LAN1 from the private address storage area 126 set in the memory 120. The CPU 110 then creates an HTTP request based on these acquired pieces of information and automatically sends the HTTP request to the monitor server SV (step S33, communication T32). The URL of the monitor server SV is stored in advance in the monitor server URL storage area 124 before shipment of the printer PRT. The details of the HTTP request sent to the monitor server SV are identical with those of the HTTP request in 2nd Embodiment shown in FIG. 9.

The monitor server SV in the monitor network system 30 receives the HTTP request sent from the printer PRT at step S33 and generates the installation ID correlated to the serial number SN of the printer PRT included in the received HTTP request (step S34).

The monitor server SV subsequently creates an HTTP response, based on the installation ID generated at step S34 and the private address of the printer PRT sent from the printer PRT at step S33, and sends back the HTTP response to the printer PRT (step S35, communication T33).

The printer PRT receives the HTTP response sent from the monitor server SV at step S35 and stores the installation ID into the installation ID storage area 122 set in the memory 120 (step S36).

The installation ID assignment method of 3rd Embodiment does not require the user's manual entry of the installation ID but requires only the user's simple operation of entering the required pieces of information in the Web browser to assign the installation ID to the printer PRT via the local area networks LAN1 and LAN2 and the Internet INT.

D. MODIFICATIONS

D-1. Modification 1

In Embodiments 1 through 3 described above, there is no specific consideration of the security in communications between the personal computer PC, the printer PRT, and the monitor server SV. Part or all of these communications may be encrypted.

In 1st Embodiment, for example, the communications made in the flow of steps S12 to S17 (FIG. 5) may be encrypted with a public key. A public key of the monitor server SV is stored in advance in the memory 120 of the network board NB of the printer PRT before shipment of the printer PRT. The communication to be sent from the printer PRT to the monitor server SV is encrypted with the public key of the monitor server SV and is sent to the monitor server SV via the personal computer PC. A public key of the printer PRT is attached to this encrypted communication. The monitor server SV uses its own secret key to decode the communication received from the printer PRT via the personal computer PC, while encrypting the communication with the public key of the printer PRT and sending the encrypted communication to the printer PRT via the personal computer PC. The printer PRT uses its own secret key to decode the communication received from the monitor server SV via the personal computer PC.

The SSL (secure sockets layer) protocol may be adopted for encrypting the communications between the personal computer PC and the monitor server SV in 2nd Embodiment or the communications between the printer PRT and the monitor server SV in 3rd Embodiment. The personal computer PC or the printer PRT making communication with the monitor server SV receives an electronic certificate from the monitor server SV, checks the contents of the received electronic certificate, and generates a common key based on the information in the electronic certificate. The personal computer PC or the printer PRT encrypts the common key with a public key of the monitor server SV included in the received electronic certificate and sends the encrypted common key to the monitor server SV. The monitor server SV uses its own secret key to decode the encrypted common key. The personal computer PC or the printer PRT and the monitor server SV then establish encrypted communication with the common key. Such modification desirably enhances the security of communications.

D-2. Modification 2

In $1^{st}$ Embodiment to 3rd Embodiment described above, the monitor server SV as the monitor apparatus of the printer PRT has both the function of receiving the serial number SN of the printer PRT, generating the installation ID correlated to the serial number SN, and making specified communications for assignment of the installation ID to the printer PRT and the function of managing the printer PRT based on the monitor information received from the printer PRT after assignment of the installation ID to the printer PRT. These functions may be dividedly allocated to multiple constituents of the monitor apparatus. For example, the monitor apparatus of the printer PRT includes a registration management server having the function of generating the installation ID and making the specified communications and a monitor server having the function of managing the printer PRT based on the monitor information. The distributive allocation of the functions of the monitor apparatus enhances the efficiencies of the respective functions and facilitates the maintenance and the repair to ensure the high reliability.

The embodiments and the modifications discussed above are to be considered in all aspects as illustrative and not restrictive. There may be many modifications, changes, and alterations without departing from the scope or spirit of the main characteristics of the present invention. One preferable application enables each user operating the user network system 20 to select one among the available methods of $1^{st}$ Embodiment to 3rd Embodiment according to the user's network management position to assign the installation ID to the printer PRT. In Modification 1, the SSL protocol is adopted for encryption of communications. This is, however, not restrictive, and any other encryption protocol, for example, SHTTP (secure hyper text transfer protocol), may be adopted for encryption of communication. In the embodiments and the modifications, the monitor object is the printer. The monitor object is, however, not restricted to the printer but may be any other device, for example, a facsimile, a scanner, or a network storage device.

What is claimed is:

1. A device monitor system including multiple devices connected to a network, an information processing apparatus connected with each of the multiple devices via the network, and a monitor apparatus configured to monitor each of the multiple devices, wherein
each of the multiple devices comprises:
a registration request receptor that receives a registration request for registering the device into the monitor apparatus via the network from the information processing apparatus on installation of the device; and
a first transmitter that sends a request for a preset first operation and a monitor apparatus address given as an address of the monitor apparatus, as a response to the registration request, to the information processing apparatus, and causes the preset operation to be performed by the information processing apparatus to allow transmission of a first identifier of physically identifying the device in combination with a device address given as an address of the device on the network to the monitor apparatus, and
the monitor apparatus comprises:
a second identifier generation request receptor that receives a second identifier generation request of generating a second identifier of logically identifying the device, along with, the first identifier and the device address;
a second identifier generator that receives the second identifier generation request and generates the second identifier, which is correlated to the first identifier and allows logical and unique identification of the device itself to be registered; and
a second transmitter that sends the generated second identifier in correlation to the device address with a request for a preset second operation to the device via the network, wherein the request for the preset second operation is a request for generating an HTTP request to be sent to the device address; and
wherein the device receives a URL of the monitor apparatus.

2. The device monitor system in accordance with claim 1, wherein the request for the preset first operation is a request for the information processing apparatus to send an e-mail to the monitor apparatus address.

3. The device monitor system in accordance with claim 1, wherein the request for the preset first operation is a request for generating an HTTP request to be sent to the monitor apparatus address, and wherein the device receives a URL of the monitor apparatus.

4. The device monitor system in accordance with claim 3, wherein the request for the preset second operation is a request for generating an HTTP request to be sent to the device address.

5. The device monitor system in accordance with claim 1, wherein the first transmitter of the device sends the first identifier and the device address to the monitor apparatus, and the second transmitter of the monitor apparatus sends the second identifier in correlation to the device address to the device.

6. The device monitor system in accordance with claim 1, wherein at least part of the sending by the first transmitter and the sending by the second transmitter is encrypted.

7. The device monitor system in accordance with claim 1, wherein the device further has a second identifier receiving/setting unit that receives the second identifier and sets the received second identifier as an identifier of the device.

8. The device monitor system in accordance with claim 1, wherein the second transmitter transmits the address of the monitor apparatus in correlation to the device address and the generated second identifier, and allows the address of the monitor apparatus to be registered in the device.

9. A method of setting an identifier into a device, which is connected to a network and is monitored by a monitor apparatus via the network, the method comprising:

receiving a registration request for registering the device into the monitor apparatus from an information processing apparatus connected via the network on installation of the device;

sending a request for a preset first operation and a monitor apparatus address given as an address of the monitor apparatus, as a response to the registration request, to the information processing apparatus, and causing the preset first operation to be performed by the information processing apparatus to allow transmission of a first identifier of physically identifying the device in combination with a device address given as an address of the device on the network to the monitor apparatus;

receiving a second identifier generation request of generating a second identifier of logically identifying the device, along with the first identifier and the device address;

receiving a the second identifier generation request and generating the second identifier which is correlated to the first identifier and allows logical and unique identification of the device itself to be registered; and sending the generated second identifier in correlation to the device address with a request for a preset second operation to the device via the network, wherein the request for the preset second operation is a request for generating an HTTP request to be sent to the device address and the device receives a URL of the monitor apparatus.

* * * * *